US 007886327B2

(12) United States Patent  
Stevens

(10) Patent No.: US 7,886,327 B2  
(45) Date of Patent: Feb. 8, 2011

(54) MEDIA CONTENT SHARING

(75) Inventor: Clarke Stevens, Littleton, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 406 days.

(21) Appl. No.: 11/840,393

(22) Filed: Aug. 17, 2007

(65) Prior Publication Data  
US 2009/0049118 A1 Feb. 19, 2009

(51) Int. Cl.  
H04N 7/173 (2006.01)

(52) U.S. Cl. .......................... 725/105; 725/41; 725/103; 725/113

(58) Field of Classification Search .................. 725/41, 725/105, 113, 103  
See application file for complete search history.

(56) References Cited  
U.S. PATENT DOCUMENTS 6,419,137 B1 * 7/2002 Marshall et al. ............... 225/41
6,795,638 B1 * 9/2004 Skelley, Jr. .................... 386/52
6,944,880 B1 * 9/2005 Allen .......................... 725/106
6,985,669 B1 * 1/2006 Unger .......................... 386/46
7,522,675 B2 * 4/2009 Sheynman et al. ........... 375/295
2003/0093260 A1 * 5/2003 Dagtas et al. .................. 704/1
2003/0221192 A1 * 11/2003 Rappaport et al. ............ 725/41
2006/0095471 A1 * 5/2006 Krikorian et al. ........ 707/104.1
2006/0174301 A1 * 8/2006 Hashimoto et al. .......... 725/100
2007/0168543 A1 * 7/2007 Krikorian et al. ........... 709/231
2007/0198532 A1 * 8/2007 Krikorian et al. ............. 707/10
2008/0186926 A1 * 8/2008 Baio et al. ................... 370/338
2008/0313541 A1 * 12/2008 Shafton et al. ............... 715/725

* cited by examiner

Primary Examiner—Christopher Kelley  
Assistant Examiner—Mulugeta Mengesha  
(74) Attorney, Agent, or Firm—Brooks Kushman P.C.

(57) ABSTRACT

A media content sharing concept wherein users are able to share highlights or other portions of content with friends. The concept may be used in any number of environments where electronic media, such as but not limited to audio, video, and multi-media, is transferable between a number of users. Bookmarks or other features may be used to facilitate accessing the video clips for subsequent viewing.

1 Claim, 2 Drawing Sheets

MEDIA CONTENT SHARING

BACKGROUND OF THE INVENTION

1. Field of the Invention

The present invention relates to sharing media content with others, such as but not limited to sharing a video clip or highlight from a television program with a friend or other recipient.

2. Background Art

Media content providers, such as but not limited to television service providers, provide many forms of electronic content to their subscribers. The content is typically broadcasted or otherwise transmitted over networks to the subscribers for storage or real-time playback. While the subscribers themselves are able to access the content, the subscribers are unable to share portions of the content with friends or other individuals. The subscribers may be able to notify friends so that they can download or otherwise access the entire content, but they are unable to share particular portions of the content with their friends.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION OF THE PREFERRED EMBODIMENT(S)

Figure 1:
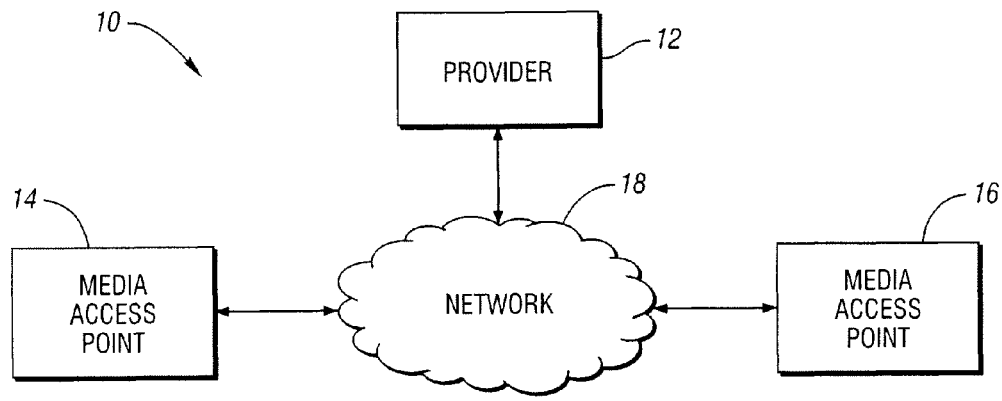
FIG. 1 illustrates a system for sharing content in accordance with one non-limiting aspect of the present invention.

FIG. 1 illustrates a system 10 for sharing content in accordance with one non-limiting aspect of the present invention. The system 10 generally applies to any environment where content associated with a provider 12 may be delivered to and between multiple media access points 14-16 having features to facilitate interfacing the media with a user or other entity. The system 10 may be adapted to any number of environments and configured to carry or otherwise facilitate any type of electronically transmissible media having content. The media may be transmitted over a network 18 or other communication medium (portable memory, etc.) having capabilities sufficient to deliver the media from one location to another.

The provider 12 may be associated with any type of media provider having capabilities to transmit media and/or any number of affiliated or non-affiliated content sources having capabilities to transmit content to the access points. For exemplary purposes only and without intending to limit the scope and contemplation of the present invention, the content source may be associated with a multiple system operator (MSO) or other entity associated with providing services to any number of subscribers by way of any number of media access points. Such MSO's may include but are not limited to cable, satellite, or broadcast television service providers, communication or cellular providers, internet service providers (data), and the like.

The network 18 may be associated with any type of network and include any combination of wireline and/or wireless features and devices to facilitate the electronic transmission of media. The network may include multiple connection points and devices to facilitate media transmission, including but not limited to transmissions occurring through fixed media (CDs, DVDs, portable memory) and transmissions over electronic networks, such as but not limited to wireline and wireless networks. The network is intended to represent a method of transferring electronic media (portable memory) and/or an infrastructure for transferring electronic media (wireline/wireless network).

The access points 14-16 may be associated with any type of access point suitable for interfacing the media with the user and/or otherwise processing the media for subsequent use. The access point may include but is not limited to a settop box (STB), digital video recorder (DVR), personal computer (PC), television (which may include embedded user interface, conditional access, and/or other processing capabilities), outlet digital adapter (ODA), media access point adapter (MTA), cable modem (CM), personal digital assistant (PDA), computer, mobile device (phone, computer, etc.), personal media device, audio/video player, and/or any other feature having capabilities for processing media.

Figure 2:
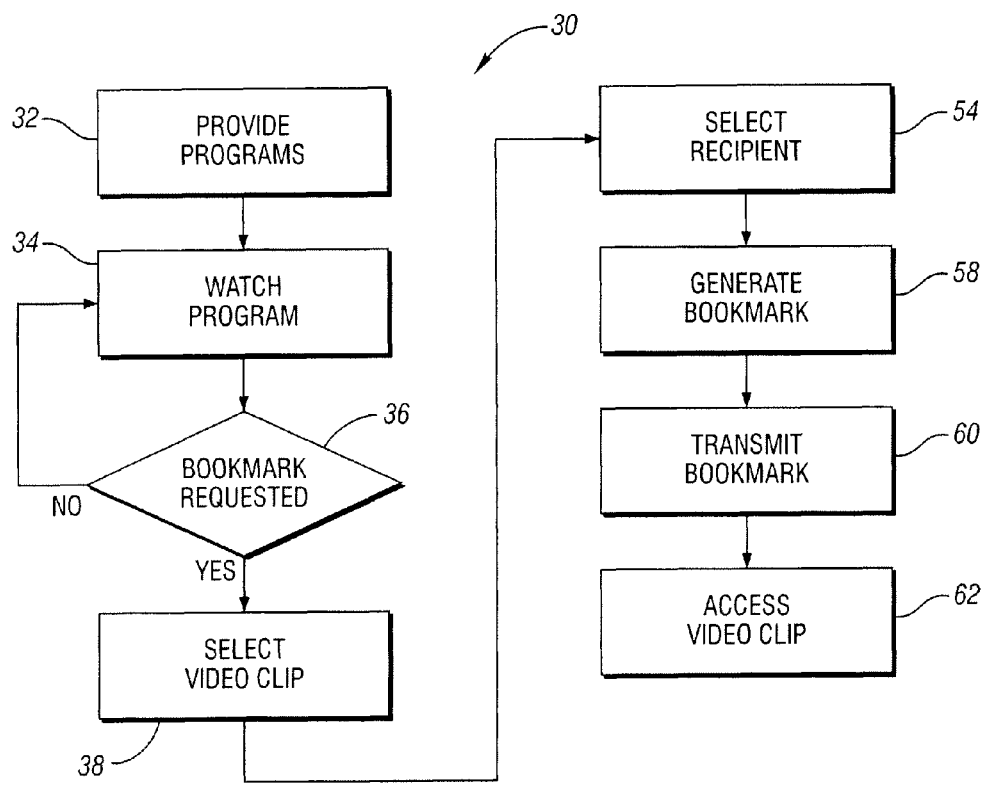
FIG. 2 illustrates a method of sharing media content in accordance with one non-limiting aspect of the present invention.

FIG. 2 illustrates a flowchart 30 of a method for sharing media content in accordance with one non-limiting aspect of the present invention. The method, for exemplary purposes and without intending to limit the scope of the of the present invention, is predominately described with respect to sharing video clips taken from television programs being watched by a television service subscriber. The present invention fully contemplates the method being suitable for using in sharing any kind of media content and not just video clips from television programs, including but not limited to sharing clips or portion of audio files, video, and other multi-media.

Block 32 relates to providing one or more programs for access by one or more subscribers. The programs may relate to television programs associated with a television service provider and carried over broadcasted or on demand television channels and signals. The programs may be half-hour programs, such as but not limited sit-coms, news shows, etc., and/or longer features, such as but not limited to movies. As noted above, the method is described with respect to television programs but the present invention is not intended to be so limited and fully contemplates the programs to encompass any form of electronically accessible or transmissible media from which a clip or portion may be taken for sharing with others.

Block 34 relates to viewing or otherwise accessing one or more of the programs. This may include a user (sender) tuning a television or STB to a particular television channel showing a desired program. An electronic programming guide (EPG) or other user interface may be used to facilitate accessing and watching the program. The program may be watched in real-time, such as if the program is part of television broadcast, and/or it may be watch on demand, such as if the program is a movie or show selected from a VOD platform or other demand service, i.e., P2P.

The viewing may correspond with the user accessing the media content from which the clip is to be taken such that Block may relate to any number of other operations depending on the type of media content being shared. This may also include the user accessing locally stored content instead of the network based content described above in Block. Such local content may include content stored on home network or local recording device, such as but not limited to a DVR.

Block 36 relates to determining a bookmark request. The bookmark request relates to the user desiring to share a portion of the watched program or other accessed media with a friend or group of friends (recipient(s)). This may occur, for example, if the user is watching a sporting event and desires to share a highlight from the event with the friend, if the user is watching a sit-com and desires to share a particularly interesting scene with a friend, etc. The bookmark request may be instigated by the user through interaction with a remote control or other feature configured to interact with the television or other output device used to facilitate accessing or viewing of the program (or other media content).

Block 38 relates to selecting the video clip to correspond with a portion of the viewed content. This may occur after the user begins watching the program and views an interesting portion or aspect that they wish to share with the recipient. The selected portion of the program may have a beginning and end represented by time stamps or other suitable markers. The user may specify the corresponding time stamps for use in defining the portion of the program that is to comprise the video clip, i.e. the portion occurring between the time stamps. The time stamps may be determined in any suitable manner.

Figure 3:
FIG. 3 illustrates a user interface for use in selecting the video clip in accordance with one non-limiting aspect of the present invention.

FIG. 3 illustrates a user interface 40 for use in selecting the video clip in accordance with one non-limiting aspect of the present invention. The user interface 40 may be supported on the output device used to view the program and/or with some other suitable device associated with the user. The user interface 40 may appear within a display portion 42 of the output device. This may allow the user to simultaneously view the program and select or more portions thereof for inclusion within the video clip. The user interface 40 may include any number of features and buttons to facilitate selecting the time stamps or multiple time stamps if multiple portions of the program are to be included within the video clip.

A bookmark selector menu 44 may be included in the user interface 40 to facilitate selecting the video clip. The bookmark selector menu 44 may include beginning and ending buttons 46-48 to facilitate selecting the beginning and ending time stamps used to define the video clip. The buttons 46-48 may be used to assign the currently showing portion of the program with either one of the beginning or end time stamps. The buttons 46-48 may also be used to access another menu or otherwise facilitate selection of the video clip. This may include providing input fields for manually inserting the time stamps, for selecting predefined time stamps, and/or any number of other time stamp selection methods.

Another option may include automatically selecting the time stamps to correspond with a previous or subsequent portion of the program. The start time stamp may be automatically determined to coincide with a portion of the program showing before selection of the begin button, such as to facilitate automatically selecting a portion of the program that has already been viewed. The end time stamp may be automatically determined to coincide with an ending of the program or a period of time occurring after selection of the begin button, such as to facilitate automatically selecting the ending or subsequent portion of the clip without having to watch the corresponding portion of the program or have the user interface displayed.

The user interface 40 may operate with a local recording device, such as but not limited to a DVR, and/or a remote recording devices, such as but not limited to a network VOD server, to facilitate selecting the video clip. This may include buffering the program in such a manner as to allow the user to rewind or fast forward the program, either while the program is showing or at some point thereafter, to the portions used to set the beginning and ending time stamps, and thereby, the length of the video clip. This can be helpful in allowing the user to scan through and select desired portions of the program for selection as the video clip. The bookmark selector menu may include control buttons 50 to facilitate these controls.

The video clip may also be selected without displaying the user interface shown in FIG. 3. A video clip recording button (not show) may be included on a remote control to facilitate selecting the video clip without displaying the user interface. The time stamps associated with the video clip may correspond with compression and decompression of the video clip recording button such that the beginning time stamp may correspond with depressing the button and the ending time stamp may correspond with releasing the depressed button (and/or actuating the button for a second time). Optionally, depression of the recording button may automatically identify a preceding or subsequent portion of the program, as opposed to the current showing portion, as the beginning or ending time stamp and/or rewind and other related controls may be include on the remote control to facilitate marking the desired portions of the program.

Multiple portions of the program may be marked with corresponding beginning and ending time stamps. This can be done in order to allow the video clip to include at least two different, non-sequential portions of the program. One portion of clip may include a first portion of the program and another portion of the clip may include a second portion of the program such that the two portions do not overlap with each other or occur immediately after the other such that at least a portion of the program is skipped within consecutively viewing both portions of the video clip.

Instigation of the bookmark request may also require the output device to communicate with a providing device (provider) associated with providing the media content in order to facilitate storing, recording, reserving, or otherwise marking the content for subsequent access by the recipient. The providing device, whether local to or remote from the user, may need to be contacted in order to save the video clip or program so that it can be subsequently retrieved and transferred. The providing device may also need to be contacted in order to facilitate rewinding or otherwise manipulating the program in order to facilitate selecting the time stamps.

Selection of the video clip may also include generating an introductory message for use in introducing or otherwise explaining the video clip. The bookmark selector menu 44 may include a message button 52 to navigate the user to another menu or otherwise facilitate generating the introductory message. The message may include a textual, video, and/or audio message generated by the user, such as to explain the video clip and its relevance the recipient (e.g. Hey, listen to the lyrics of this song here, or check out this scene of the movie). The message may be automatically stored and associated with the video clip to facilitate its delivery with the video clip and/or bookmark.

Returning to FIG. 2, Block 54 relates to selecting a recipient desired by the sender (user) to receive the video clip. The user interface 40 shown in FIG. 3 may include a recipient selection button 56 to facilitate selecting the recipient. Selection of the button 56 may navigate the sender to another menu listing multiple recipients (friends) and/or it may be used to provide a input field for inputting the recipient. Selection of the recipient may correspond with selecting any suitable addressing or representative address sufficient for communicating with the recipient. The remote control of other feature may be similarly used to facilitate selecting and identifying the recipient and their correspondence address.

Block 58 relates to generating a bookmark for delivery to the recipient. The bookmark generally corresponds with instructions and/or other features suitable for transferring or otherwise providing the recipient with access to the video clip and/or introductory message. The bookmark may be embodied in any suitable electronic form, such as but not limited to a message, file, etc., that may be wholly or partially transmitted to the recipient. The bookmark, or the contents associated therewith, may be formatted and/or translated to a format or protocol sufficient for operation with an output device used by the recipient to access the video clip.

The bookmark may include the introductory message, if used, and instructions to facilitate accessing the video clip. The message may be used by the recipient to assess their interest in the video clip. If interested, the recipient may follow the instructions included in the bookmark to access the video clip. The instructions may include instructions suitable for instructing the output device of the recipient to access the video clip, such as by downloading the clip, accessing it through a VOD server, P2P streaming from a recording device of the sender, or other suitable methodology. The bookmark may also include the video clip along with the introductory message and/or other features and instructions associated with the bookmark.

Blocks 60-62 relate to transmitting the bookmark to the recipient and accessing the video clip. This may include transferring the bookmark to the recipient and the recipient subsequently downloading the video clip from a server and/or accessing the video clip from the bookmark, depending on whether the video clip was included within the bookmark. The video clip, introductory message, and/or other features and instructions associated with the bookmark by be stored on the output device (DVR) of the recipient for subsequent access and/or download from a server (headend, VOD server) or the sender's recorder. The bookmark may be formatted or otherwise translating to a format or protocol sufficient for access though the output device of the recipient. Optionally, the bookmark may be stored by the sender or never addressed to a recipient so that sender can compile video clips from various programs of interest.

The present invention provides any number of advantages and benefits to service providers in that it allows subscribes to generate bookmarks that may be transmitted to friends and/or stored for personal usage. The bookmarks may be used to share highlights from longer pieces of content with friends or to save them for personal use. A list of bookmarks associated with media content may be created, managed, stored and communicated in any suitable manner. The list may be separate from the actual content so that it is independent of the particular codec, DRM, etc. used with the content. The bookmark list may also include a reference to a known location for the content so that a user receiving the list can locate the content file for download and/or purchase.

The present invention allows users to share particular locations in media files (e.g. a specific scene in a movie) with each other. Since this can be done independent of the particular codec used or the DRM system, users may have the content in different formats on different devices, but still be able to share bookmark locations with each other without being concerned about the format of the content, whether the recipient already has the content, or other minutiae. The bookmarks can help convey interesting information about content for users, optionally without communicating the actual content or being concerned about the coding format of the content on different systems. A user who already has rights to it can use the bookmark without any hassle and if the user doesn't already have rights to the content, the content can be quickly purchased and used with the bookmarks.

While the present invention is predominately described with respect to providing bookmarks associated with video clips, the present invention is not intended to be so limited. The present invention fully contemplates generating bookmarks for any selectable portion of electronic media and not just video clips associated with television channels.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of sharing a video clip taken from a television program broadcasted from a source, the method comprising:
    providing a user interface for use by a sender while watching the television program, the user interface overlaying a portion of a display showing the television program and having features to facilitate selecting beginning and ending time stamps for specifying a length of the video clip to be taken from the program, the user interface further including features to facilitate inputting an introductory message and a recipient, the introductory message for use in introducing the video clip and the recipient for use in sharing the video clip;
    receiving instructions from the sender marking the beginning and ending time stamps, the time stamps spanning a portion less than an entire length of the program;
    storing the video clip at the source for subsequent viewing by the recipient;
    transmitting a bookmark having instructions for accessing the video clip and the introductory message to the recipient; and
    receiving instructions associated with separately marking multiple portions of the program to be included with the same video clip such that the video clip shows at least two different, non-sequential portions of the program.

* * * * *